US011766901B2

(12) United States Patent
Cartelet

(10) Patent No.: US 11,766,901 B2
(45) Date of Patent: Sep. 26, 2023

(54) INFLATION DEVICE FOR TUBELESS TIRES

(71) Applicant: RUNFLAT INTERNATIONAL LTD, Cradley Heath (GB)

(72) Inventor: Eric Cartelet, Cradley Heath (GB)

(73) Assignee: RUNFLAT INTERNATIONAL LTD, Cradley Heath (GB)

(*) Notice: Subject to any disclaimer, the term of this patent is extended or adjusted under 35 U.S.C. 154(b) by 749 days.

(21) Appl. No.: 16/960,263

(22) PCT Filed: Oct. 17, 2018

(86) PCT No.: PCT/IB2018/058038
§ 371 (c)(1),
(2) Date: Jul. 6, 2020

(87) PCT Pub. No.: WO2019/077510
PCT Pub. Date: Apr. 25, 2019

(65) Prior Publication Data
US 2021/0070102 A1 Mar. 11, 2021

(30) Foreign Application Priority Data

Oct. 18, 2017 (IT) .......................... 102017000117867

(51) Int. Cl.
| | | |
|---|---|---|
| *B60C 23/00* | (2006.01) | |
| *B60B 25/08* | (2006.01) | |
| *B60B 25/20* | (2006.01) | |
| *B60B 25/22* | (2006.01) | |

(52) U.S. Cl.
CPC ............ *B60C 23/001* (2013.01); *B60B 25/08* (2013.01); *B60B 25/20* (2013.01); *B60B 25/22* (2013.01); *B60B 2310/202* (2013.01); *B60B 2310/208* (2013.01); *B60B 2360/102* (2013.01); *B60B 2360/104* (2013.01); *B60B 2360/106* (2013.01); *B60B 2360/3416* (2013.01)

(58) Field of Classification Search
CPC . B60C 23/001; B60C 23/00318; B60B 25/22; B60B 25/08; B60B 25/10
See application file for complete search history.

(56) References Cited

U.S. PATENT DOCUMENTS

| | | | |
|---|---|---|---|
| 4,434,833 A | 3/1984 | Swanson et al. | |
| 4,705,090 A | 11/1987 | Bartos | |
| 6,474,383 B1 * | 11/2002 | Howald | ............ B60C 23/00318 |
| | | | 152/416 |
| 7,168,468 B2 * | 1/2007 | Wang | ................ B60C 23/00318 |
| | | | 152/428 |

(Continued)

FOREIGN PATENT DOCUMENTS

| | | |
|---|---|---|
| EP | 2 544 906 A1 | 1/2013 |
| FR | 2 731 655 A1 | 9/1996 |

OTHER PUBLICATIONS

International Search Report and Written Opinion of the International Searching Authority for International Patent Application No. PCT/IB2018/058038 dated Dec. 21, 2018, 11 pages.

*Primary Examiner* — Jason R Bellinger
(74) *Attorney, Agent, or Firm* — Merchant & Gould P.C.

(57) ABSTRACT

A wheel assembly includes a wheel having an outer rim and a hub. A first coupling is applied to the hub. A non-return valve is housed in the first coupling, and a second fitting is applied separably between the hub and the outer rim to connect the outlet of the hub hole with the channel hole.

7 Claims, 4 Drawing Sheets

(56) References Cited

U.S. PATENT DOCUMENTS

| | | | |
|---|---|---|---|
| 8,844,596 B2* | 9/2014 | Medley | B60C 23/002 |
| | | | 152/428 |
| 8,931,534 B2* | 1/2015 | Eaton | B60C 23/00354 |
| | | | 152/416 |
| 2005/0236081 A1* | 10/2005 | Marsaly | B60B 25/002 |
| | | | 152/396 |
| 2010/0163148 A1 | 7/2010 | Rogers | |
| 2013/0282232 A1* | 10/2013 | Medley | B60C 23/002 |
| | | | 152/427 |
| 2020/0231001 A1* | 7/2020 | Renson | B60C 29/02 |

\* cited by examiner

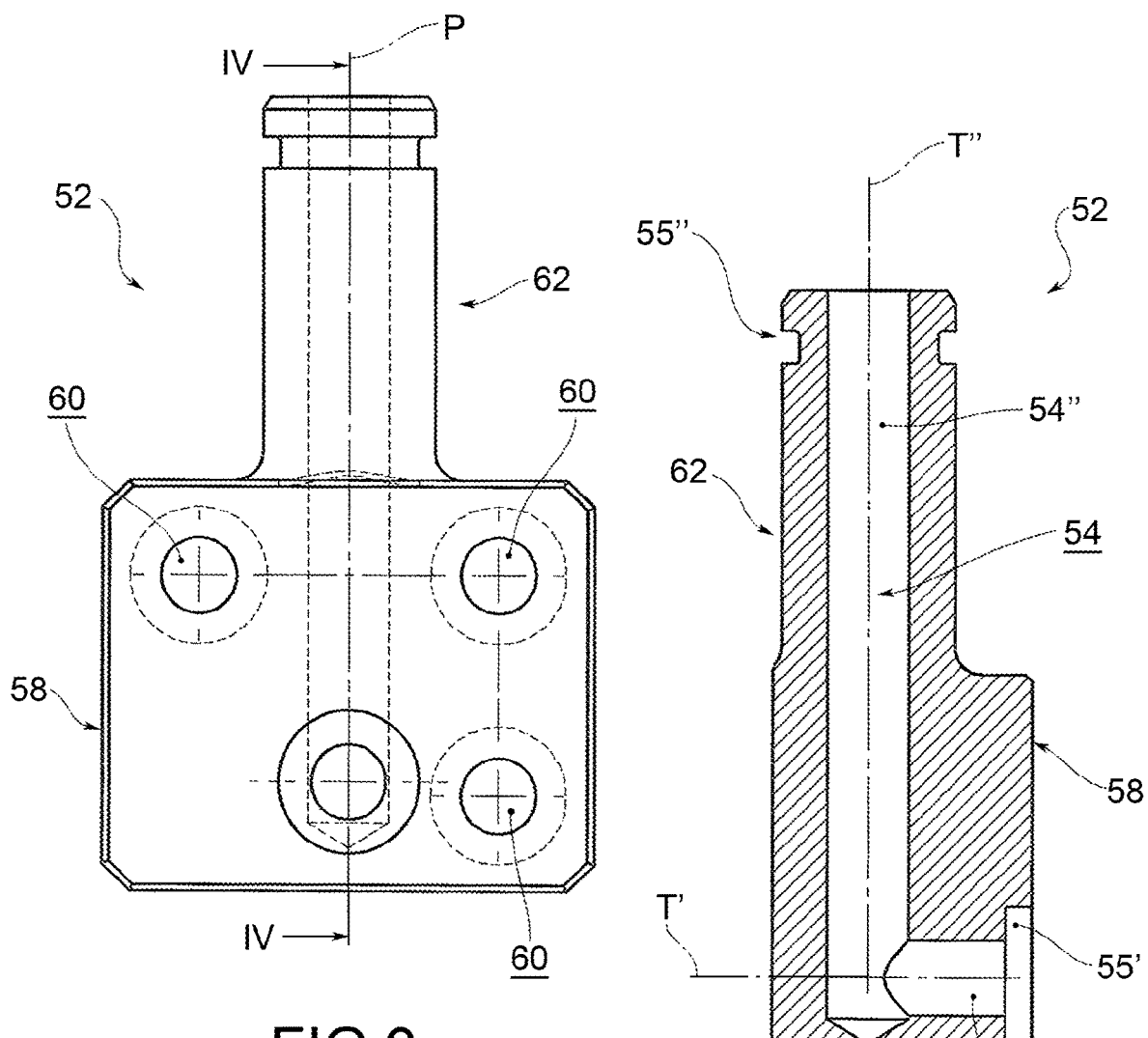
FIG.3
FIG.4
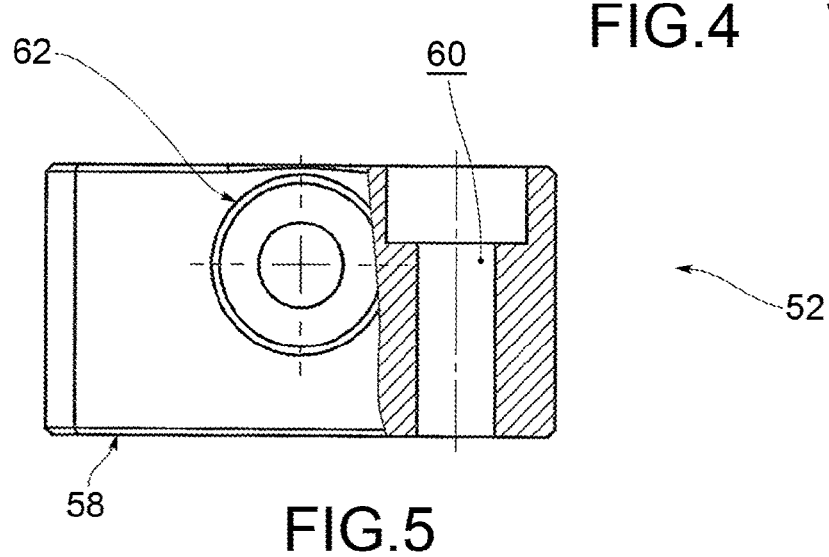
FIG.5

INFLATION DEVICE FOR TUBELESS TIRES

CROSS-REFERENCE TO RELATED APPLICATIONS

This application is a National Stage Application of PCT/IB2018/058038, filed 17 Oct. 2018, which claims the benefit of Serial No. 102017000117867, filed 18 Oct. 2017 in Italy, and which applications are incorporated herein by reference. To the extent appropriate, a claim of priority is made to each of the above-disclosed applications.

FIELD OF THE INVENTION

The present invention is in the field of wheels, both integral and multi-component, for vehicles in general, for example in the automotive sector or vehicles for transporting goods or military vehicles. In particular, the present invention relates to an inflation device for a tubeless tire fixed to the wheel and usable for tire inflation, for example during tire maintenance or tire repair.

BACKGROUND OF THE INVENTION

Today's known systems that allow the inflation of the tire, and therefore the connection of the stem with the inside of the tire, are essentially of two types:
- systems using flexible tubes to connect the stem to the inside of the tire, or particularly long stems; such systems have significant drawbacks, mainly linked to the tendency to break, especially when using the vehicle on rough terrain, resulting in the impossibility of maintaining the desired pressure in the chamber;
- Systems that provide for a series of conduits internal to the wheel connecting the stem with the chamber; such systems are very functional, but dirt accumulation in the conduits, resulting in obstructions of the path conveying the inflating air to the chamber, makes it typically necessary to disassemble the wheel and clean the conduits or replace the entire wheel.

SUMMARY OF THE INVENTION

The object of the present invention is to provide an inflation device to be fastened to the wheel which overcomes the drawbacks mentioned above with reference to the known art and, in particular, is especially reliable, even under critical conditions, is easy to manufacture, so as to keep the costs low, and is easy to maintain, to make maintenance and repairs smooth and fast.

Such object is achieved by a wheel provided with an inflation device as described and claimed herein. Advantageous embodiments of the invention are also described.

BRIEF DESCRIPTION OF THE DRAWINGS

The features and advantages of the wheel with inflation device according to the present invention will be apparent from the description given below, provided by way of non-limiting example, in accordance with the appended figures, wherein:

FIG. 3 shows a view of a second fitting of the inflation assembly according to an embodiment of the present invention;

FIG. 4 is a sectional view of the second fitting of FIG. 3, according to the sectional plane IV-IV in FIG. 3;

FIG. 5 shows a plan view of the second fitting of FIG. 3 partially in section.

DETAILED DESCRIPTION OF THE PREFERRED EMBODIMENTS

Figure 1:
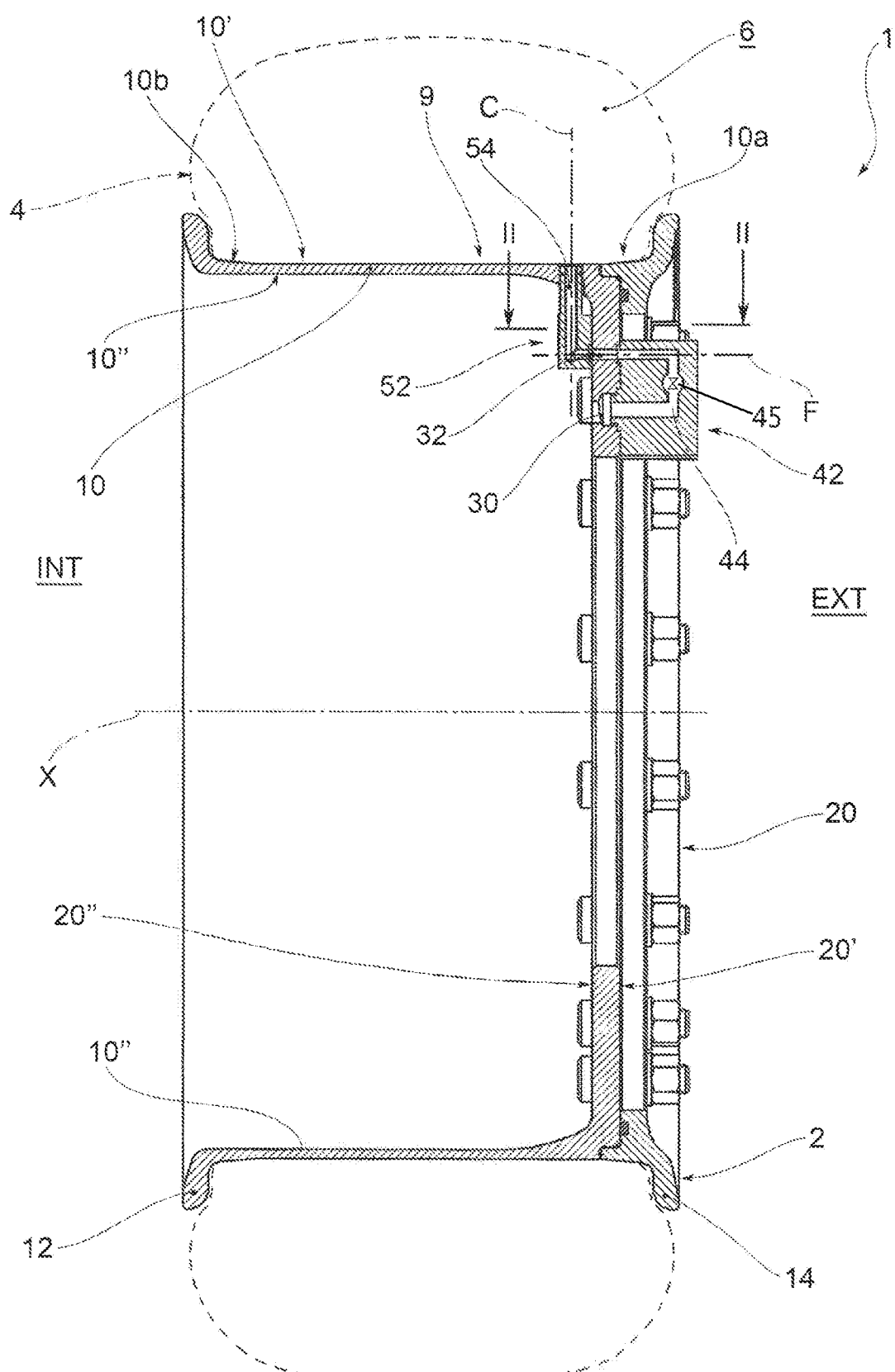
FIG. 1 shows a wheel assembly comprising a wheel and an inflation device according to a form of embodiment of the present invention.
Figure 2:
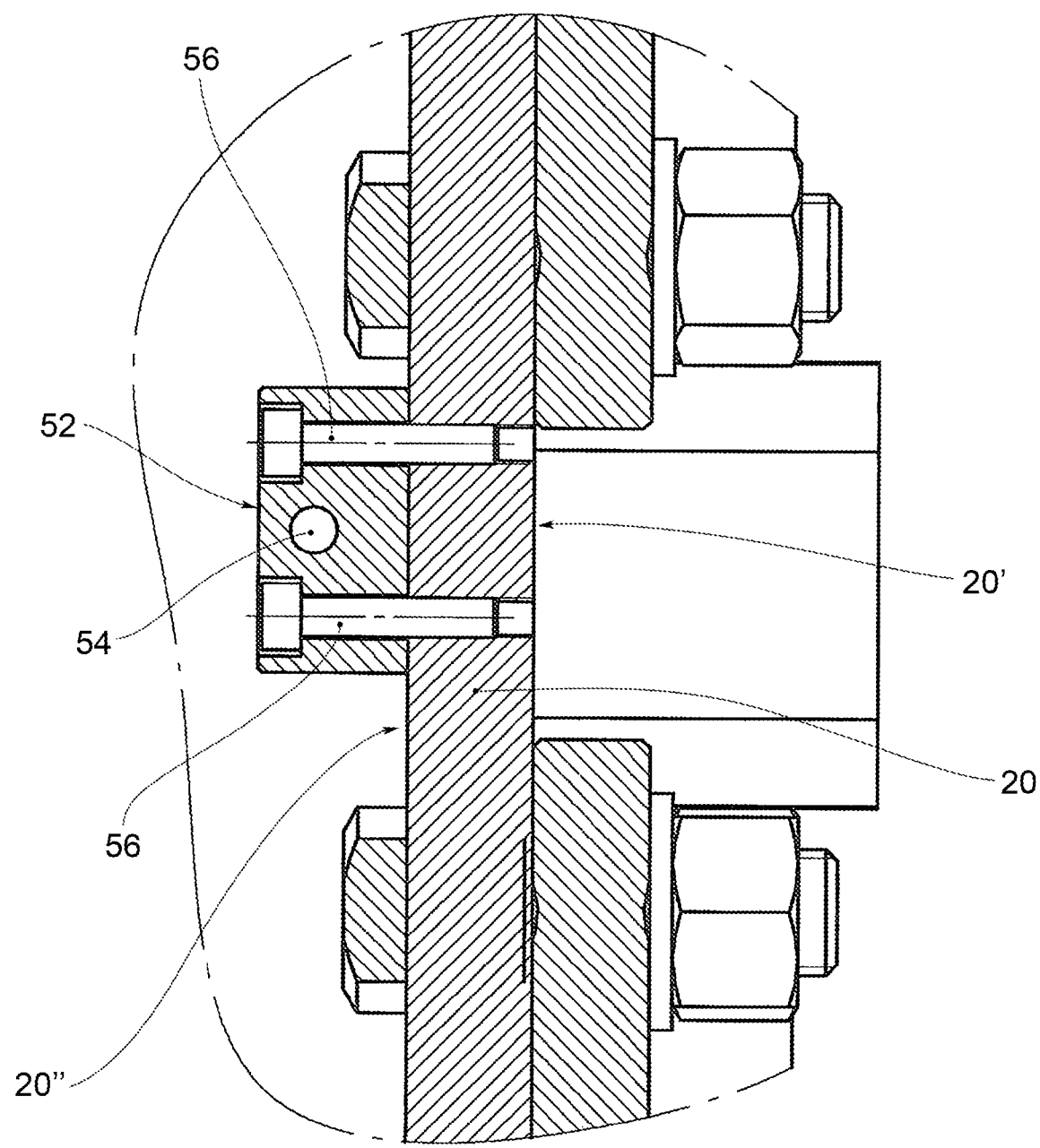
FIG. 2 is a sectional view of the wheel assembly of FIG. 1, according to the sectional plane II-II of FIG. 1.
Figure 6:
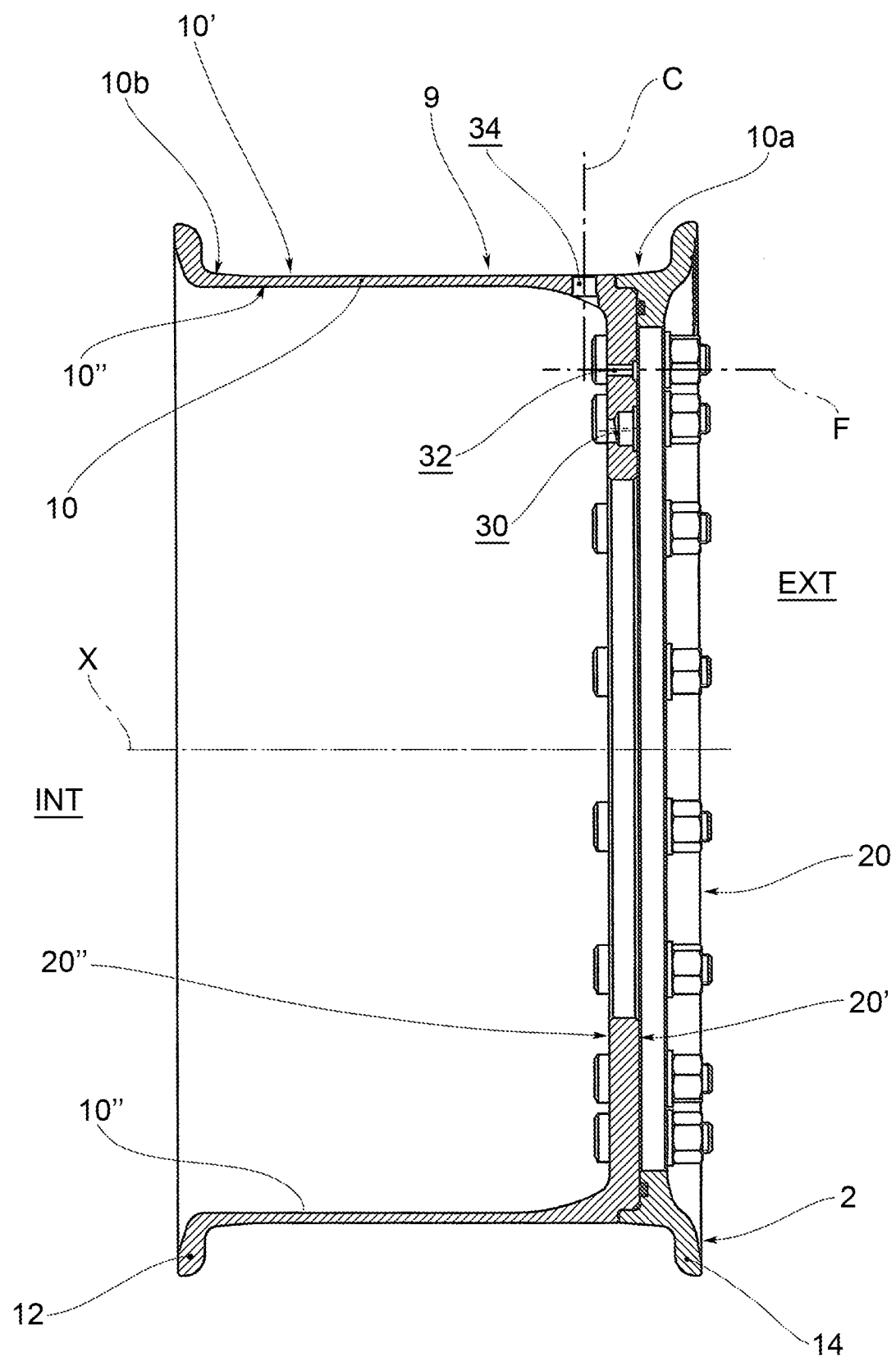
FIG. 6 shows a wheel of the wheel assembly of FIG. 1.

With reference to the accompanying drawings, a wheel assembly consisting of a wheel of a vehicle, for example a motor vehicle, a motorcycle, or a commercial or military vehicle, and an inflation device, is indicated collectively at 1.

The wheel comprises a wheel 2 and a tire 4, within which a chamber 6 is delimited for the containment of the pressurized air.

Preferably, the tire 4 is tubeless.

The wheel 2 is typically made of metal, for example steel, die-cast or forged aluminum alloy or magnesium alloy or carbon fiber.

According to a variant of embodiment, the wheel is of the integral type, i.e., in one piece; according to further variants of embodiment, the wheel is multi-component, i.e., made of several parts assembled together, as in the illustrated case.

The wheel 2 comprises an outer crown or annular rim 9, to which the tire is applied.

The crown 9 comprises a cylindrical channel wall 10 having a central axis X coincident with the axis of rotation of the wheel.

Said channel wall 10 extends axially between a outer end 10a, facing the inside of the vehicle, and a inner end 10b, facing the outside of the vehicle. The axial extension of the channel wall generally determines the "width" of the wheel.

Preferably, said channel wall 10 has an outer lateral surface 10' that delimits the chamber 6 and an opposite inner lateral surface 10".

Preferably, the crown 9 further comprises an annular inner flange 12 protruding from the channel wall 10 at the inner end 10b and a outer flange 14 protruding from the channel wall 10 at the outer end 10a.

The wheel 2 further comprises a hub 20, integral with the crown 9, for example made in one piece therewith, intended to be fixed to the axle of the vehicle, for example by bolts.

According to the embodiment illustrated, the hub 20 is in the form of a plate perpendicular to the central axis X, joined to the channel wall 10, for example at the rear end 10a.

The hub thus has an internal hub surface 20" facing the inside of the vehicle and an outer hub surface 20' facing the outside of the vehicle.

According to a further embodiment (not shown), the hub is connected to the channel wall 10 by means of a plurality of radial spokes.

The wheel 2 has, through said hub 20, a through-hole 30 through which the inner hub surface 20" communicates with the outer hub surface 20'.

The through-hole 30 is intended to engage a compressor to inject air under pressure.

Additionally, the wheel 2 has, through the hub 20, a hub through-hole 32, through which the outer hub surface 20' communicates with the inner hub surface 20"; for example, said hub hole 32 is executed with hub axis F parallel to the central axis X.

Furthermore, the wheel 2 has, through the channel wall 10, a channel through-hole 34 through which the inner channel surface 10" communicates with the outer channel surface 10', leading therefore into the chamber 6; for example, said channel hole 34 is executed with a channel hole axis C perpendicular to the central axis X.

An inflation device according to the present invention comprises a first fitting 42 provided with at least a first inner conduit 44.

The first fitting 42 is applicable to the wheel 2 so as to connect, through said first inner conduit 44, the through-hole 30 with the hub hole 32.

In other words, said first inner conduit 44 is suitable to connect the outlet of the through-hole 30 on the outer surface 20' of the hub 20 with the inlet of the hub hole 32 on said outer surface 20' of the hub 20.

Preferably, said first fitting 42 is applied to the wheel 2 by means of bolts.

The inflation device comprises furthermore a non-return valve 45, housed in the first fitting 42, along the first inner conduit 44, normally closed, suitable to open to allow air under pressure to enter from the inlet of the through-hole 30 and to close to obstruct the outflow of air from said through-hole 30.

The inflation device according to the present invention further comprises a second fitting 52 provided with at least a second inner conduit 54.

The second fitting 52 is applicable to the wheel 2 so as to connect, through said second inner conduit 54, the hub hole 32 with the channel hole 34.

In other words, said second inner conduit 54 is suitable to connect the outlet of the valve hole 32 on the inner surface 20" of the hub 20 with the inlet of the channel hole 34 on said inner surface 10" of the rim 9.

Preferably, said second fitting 52 is applied to the wheel 2 by means of bolts 56.

According to a preferred embodiment, the second fitting 52 comprises a attaching portion 58, for example, in the form of a parallelepiped, provided with holes 60 for inserting the bolts 56.

Preferably, the attaching portion 58 is intended to meet the hub 20, and in particular, to come in contact with the inner hub surface 20".

Furthermore, according to this embodiment, the second fitting 52 comprises a perforated shank 62 protruding from the attaching portion 58; the shank 62 is intended to engage with the channel hole 34.

Internally to the second fitting 52, the second inner conduit 54 is formed.

Said second inner conduit 54 preferably has a hub portion 54', within the fastening portion 58 extending along a first axis portion T'.

The hub portion 54' terminates with a first sealing seat 55', preferably internal, for receiving a first O-ring to make the seal with the hub hole 32.

Additionally, the second inner conduit 54 comprises a channel portion 54", predominantly within the shank 62, extending along a second axis portion T", preferably orthogonal to the first axis portion T'.

The channel portion 54" ends with a second sealing seat 55", preferably outer, for receiving a second O-ring to seal with the channel hole 34 within which the shank 62 is partially inserted.

Preferably, the second fitting 52 is made of high strength aluminum alloy, magnesium alloy or carbon fiber.

In the normal use of the wheel assembly described above, the pressurized air passes through the valve hole, the first inner conduit of the first fitting, the hub hole, the second inner conduit of the second fitting, and the channel hole, thus reaching the chamber.

Innovatively, the inflating device according to the present invention overcomes the drawbacks of the known art, since it is particularly robust and reliable for carrying out maintenance or repair of the wheel.

In addition, the construction is particularly simple as the wheel only requires the addition of two additional holes (the hub hole and the channel hole), while the two fitting bodies are made separately from the wheel and then applied thereto.

It is clear that one skilled in the art, in order to meet specific needs, may make changes to the inflation device described above, all contained within the scope of protection defined by the following claims.

The invention claimed is:

1. A wheel assembly comprising:
   a wheel comprising:
     an outer crown or rim for mounting a tire, comprising a cylindrical channel wall having an outer channel surface and an inner channel surface, said cylindrical channel wall being crossed by a channel hole having an inlet on the inner channel surface and an outlet on the outer channel surface;
     a hub for fixing to an axle of a vehicle, the hub being integral with the outer crown, having an outer hub surface and an inner hub surface, said hub being crossed by a through-hole for inflating the tire, having an inlet on the inner hub surface and an outlet on the outer hub surface, and a hub hole having an inlet on the outer hub surface and an outlet on the inner hub surface;
   a first fitting separably applied to the hub, provided with at least one first inner conduit for connecting the outlet of the through-hole with the hub hole;
   a normally closed non-return valve, housed in the first fitting, along the at least one first inner conduit, openable to allow air under pressure to enter from the inlet of the through-hole;
   a second fitting, provided with at least one second inner conduit, applied separably between the hub and the outer crown to connect the outlet of the hub hole with an entrance of the channel hole;
   wherein the second fitting comprises:
     an attaching portion provided with holes for inserting bolts in abutment with the hub, and in contact with the inner hub surface; and
     a perforated shank protruding from the attaching portion engaging with the channel hole.

2. The wheel assembly of claim 1, wherein the first fitting is applied to the wheel by bolts.

3. The wheel assembly of claim 1, wherein the second fitting is applied to the wheel by bolts.

4. The wheel assembly of claim 1, wherein the hub hole has a hub hole axis parallel to a central axis and the channel hole has a channel hole axis perpendicular to the central axis.

5. The wheel assembly of claim 1, wherein the at least one second inner conduit comprises:
   a hub portion terminating with a first sealing seat for a first O-ring to form a seal with the hub hole;
   a channel portion terminating with a second sealing seat for a second O-ring to form a seal with the channel hole.

6. The wheel assembly of claim 1, wherein the wheel is made of steel, die-cast or forged aluminum alloys, die-cast or forged magnesium alloys, or carbon fiber.

7. The wheel assembly of claim 1, wherein the second fitting is made of high strength aluminum alloy, magnesium alloy or carbon fiber.

\* \* \* \* \*